United States Patent
Ramjee et al.

(10) Patent No.: US 7,975,071 B2
(45) Date of Patent: Jul. 5, 2011

(54) CONTENT COMPRESSION IN NETWORKS

(75) Inventors: Ramachandran Ramjee, Bangalore (IN); Ranjita Bhagwan, Bangalore (IN); Venkata N. Padmanabhan, Bangalore (IN); Manveer Singh Chawla, Madhya Pradesh (IN)

(73) Assignee: Microsoft Corporation, Redmond, WA (US)

( * ) Notice: Subject to any disclaimer, the term of this patent is extended or adjusted under 35 U.S.C. 154(b) by 620 days.

(21) Appl. No.: 12/016,587

(22) Filed: Jan. 18, 2008

(65) Prior Publication Data
US 2009/0187673 A1 Jul. 23, 2009

(51) Int. Cl.
- G06F 15/16 (2006.01)
- G06F 15/177 (2006.01)
- H04L 12/66 (2006.01)
- H04J 3/24 (2006.01)

(52) U.S. Cl. ........ 709/247; 709/219; 709/221; 370/352; 370/474

(58) Field of Classification Search .................. 709/202, 709/219, 220; 370/477
See application file for complete search history.

(56) References Cited

U.S. PATENT DOCUMENTS

| | | | |
|---|---|---|---|
| 5,978,386 A | 11/1999 | Hamalainen et al. | |
| 6,438,678 B1 | 8/2002 | Cashman et al. | |
| 6,456,594 B1 | 9/2002 | Kaplan et al. | |
| 6,631,420 B1 | 10/2003 | Li et al. | |
| 7,716,314 B1* | 5/2010 | Chen et al. | 709/223 |
| 7,773,634 B1* | 8/2010 | Machiraju | 370/476 |
| 2003/0030575 A1* | 2/2003 | Frachtenberg et al. | 341/51 |
| 2003/0061405 A1 | 3/2003 | Fisher et al. | |
| 2003/0063564 A1 | 4/2003 | Ha et al. | |
| 2003/0099237 A1 | 5/2003 | Mitra et al. | |
| 2003/0152084 A1* | 8/2003 | Lee et al. | 370/395.21 |
| 2004/0146053 A1 | 7/2004 | Nabhan et al. | |
| 2004/0148597 A1 | 7/2004 | Lilley | |
| 2004/0165527 A1* | 8/2004 | Gu et al. | 370/229 |
| 2005/0138530 A1 | 6/2005 | Huang et al. | |
| 2005/0188081 A1* | 8/2005 | Gibson et al. | 709/224 |
| 2006/0047855 A1* | 3/2006 | Gurevich et al. | 709/247 |
| 2006/0184652 A1 | 8/2006 | Teodosiu et al. | |
| 2007/0058610 A1* | 3/2007 | Brandstatter | 370/352 |
| 2007/0121653 A1 | 5/2007 | Reckamp et al. | |

(Continued)

FOREIGN PATENT DOCUMENTS

JP 2002-268937 A 9/2002

OTHER PUBLICATIONS

Muthitacharoen et al., "A low-bandwidth Network File System", Oct. 2001.*

(Continued)

Primary Examiner — Wen-Tai Lin

(57) ABSTRACT

Described is transparently compressing content for network transmission, including end-to-end compression. An end host or middlebox device sender sends compressed packets to an end host or middlebox device receiver, which decompresses the packets to recover the original packet. The sender constructs compressed packets including references to information maintained at the receiver, which the receiver uses to access the information to recreate actual original packet content. The receiver may include a dictionary corresponding to the sender, e.g., synchronized with the sender's dictionary. Alternatively, in speculative compression, the sender does not maintain a dictionary, and instead sends a fingerprint (hash value) by which the receiver looks up corresponding content in its dictionary; if not found, the receiver requests actual content. Scheduling to maintain fairness and smoothing bursts to coexist with TCP congestion control are also described, as are techniques for routing compressed data over networked end hosts and/or compression-enabled middlebox devices.

18 Claims, 13 Drawing Sheets

U.S. PATENT DOCUMENTS

2010/0103953 A1* 4/2010 Matias et al. ............... 370/477

OTHER PUBLICATIONS

Teodosiu et al., "Optimizing File Replication over Limited-Bandwidth Networks using Remote Differential Compression", Nov. 2006.*

Bromberg Peter A., "Product Review: XCompress", http://www.eggheadcafe.com/Articles/20020907.asp.

Spring, et al., "A Protocol-Independent Technique for Eliminating Redundant Network Traffic", Date: 2000, vol. 30, Issue: 4, pp. 87-95.

International Search Report and Written Opinion Received for PCT Application No. PCT/US2008/088096, mailed on Jun. 25, 2009, 9 pages.

* cited by examiner

CONTENT COMPRESSION IN NETWORKS

BACKGROUND

Many networked services have global users, both in the consumer and enterprise spaces. For example, a large corporation may have branch offices at dozens of cities around the world. In such a setting, the servers that power the corporation's IT services (e.g., email servers, file servers) may be centralized/concentrated at one location or a small number of locations, sometimes referred to as consolidated data centers. This lowers administration costs. However, consolidated data centers drive up networking costs and also hurt performance, because, for example, what would have normally been LAN traffic (e.g., between a local client and a local file server) becomes much slower WAN traffic (e.g., between a local client and a remote file server).

As is understood, the servers and services may be alternatively distributed so as to be closer to clients. However, this increases the complexity and cost of developing and administering the services. A similar tradeoff arises in the context of consumer services such as web-based email and on-demand video streaming targeted at a global audience; geographically distributing content improves performance, but at a high operational cost.

In sum, while consolidated data centers are beneficial with respect to cost savings in data storage and administration, there is a significant loss of performance and increase in networking costs when they are used. Technology that improves such performance when using data centers is thus highly desirable.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which content is compressed for network transmission, by an end host sender to send to an end host receiver, an end host sender to a middlebox device receiver, a middlebox device sender to an end host receiver, or a middlebox device sender to a middlebox device receiver. The sender constructs a compressed packet that includes a reference to information maintained at the receiver, by which the receiver can recreate the content of an original packet. The sender sends the compressed packet to the receiver. In turn, the receiver accesses its information based on the reference to recreate the actual content of the original packet. The receiver may include a dictionary corresponding to the sender, e.g., synchronized with the sender's dictionary, whereby the sender can use a token comprising offset, length data as the reference. Alternatively, in a speculative compression model, the sender can send a data chunk fingerprint (hash value) corresponding to content, and the receiver can look for content corresponding to the data chunk fingerprint. If not found, the receiver requests the actual content.

In one example implementation, a receiver receives network packets from a sender including compressed packets that each contains one or more references to content. A decompression mechanism comprising logic or a software service coupled to the receiver accesses a dictionary to attempt to locate content in the dictionary corresponding to each reference. If found, the decompression mechanism merges the content located in the dictionary with any other content in the packet into a decompressed packet. The content may be compressed with an RDC* compression (an extension of the Remote Differential Compression) mechanism, or a speculative compression mechanism. For speculative compression, if the decompression mechanism fails to locate matching content in the receiver dictionary from a given data chunk fingerprint, the decompression mechanism requests corresponding actual content from the sender.

In one aspect, a software service at a sender compresses content for decompression at a counterpart software service at a receiver. An original packet is trapped at the socket layer, and a dictionary accessed for substituting a reference to content in the original packet in place of actual content, to provide a compressed packet to the receiver. The receiver decompresses the compressed packet into a content copy of the original packet, including by using the reference to locate the referenced content in a dictionary maintained at the receiver.

Routing techniques are also provided, such as based on compression ratio data and/or packet probes. Fair scheduling by scheduling packets after compression, and congestion control techniques to smooth data flow, e.g., by adding jitter to TCP acknowledgements (ACKs), are also described.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards content compression in networks that operates in a manner that saves bandwidth costs/improves networking performance by eliminating redundancy in traffic. To this end, there is generally described protocol-independent content compression between hosts and access routers, between routers/middleboxes on bandwidth-limited links, and also directly between hosts.

In one aspect, the technology described herein provides compression as an end-to-end service, such as a compression service running in each of a client and server. The compression service is transparent to applications, operates in a protocol-independent manner and works with secure sockets layer (SSL)/internet protocol security (IPSEC) and so forth.

While various examples used herein are directed towards a client-server model, and a middlebox device model, other devices such as routers may also implement content compression as described herein, and any of the models and/or devices may be combined. Further, while suitable compression mechanisms (algorithms) are described herein, including speculative compression and RDC* (an extension of the Remote Differential Compression, or RDC algorithm, used in a distributed file system replication function in contemporary Microsoft® Windows® operating system versions, as described by Dan Teodosiu, Nikolaj Bjorner, Yuri Gurevich, Mark Manasse and Joe Porkka, "*Optimizing File Replication over Limited-Bandwidth Networks using Remote Differential Compression*," Microsoft Research Technical Report MSR-TR-2006-157, November 2006), the technology is not limited to any particular compression algorithm or algorithms, or to any operating system. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in content compression in general.

In one aspect, end-to-end compression may use dictionaries at each end, and may be targeted to settings where compression is useful. For example, a client and server may include compression services that operate to compress network data in a manner that is transparent to applications and other entities in the network path.

Figure 1:
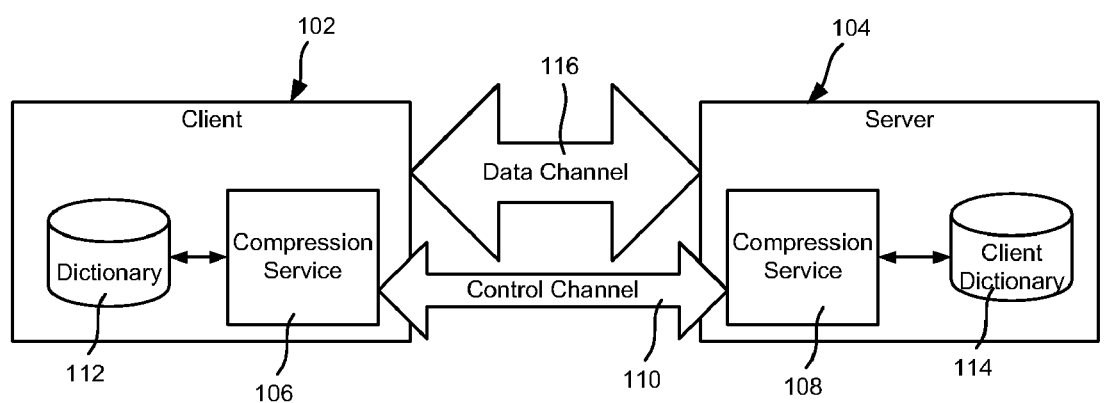
FIG. 1 is a block diagram representing example components for implementing content compression in networks in which client and server compression services access dictionaries to perform compression and decompression.

FIG. 1 shows an example of such a service-based approach, in which a client 102 and server 104 each run a compression service 106 and 108, respectively. A control channel 110 between the client 102 and server 104 is used to determine the suitability for compression, such as based on latency and bandwidth availability. In the event compression is suitable, the client 102 and server 104 further may use the control channel 110 to negotiate parameters, such as which compression algorithm to use, which dictionary size to use, compression algorithm parameters, and so forth.

Figure 2:
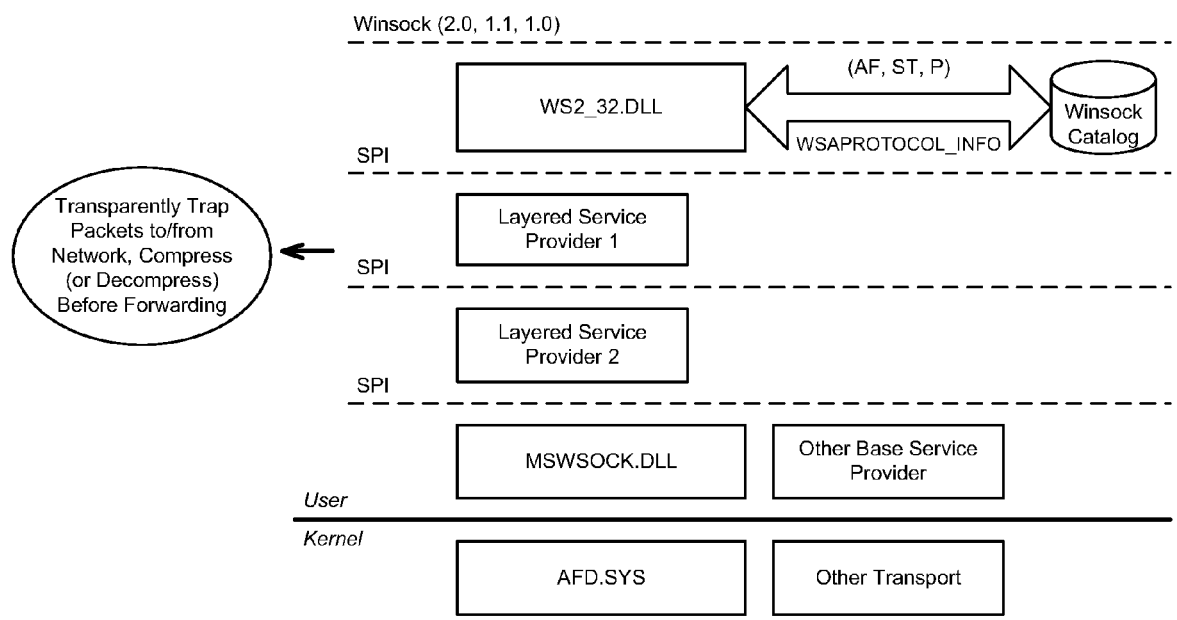
FIG. 2 is a representation of one environment in which a compression service may be implemented.

In general, when compression is enabled, the compression service at each of the client and server installs a hook in the respective protocol stack to capture packets to and from the network. For example, in a Microsoft® Windows®-based operating system, the layered service provider framework may be used; FIG. 2 is a representation of an example such framework.

Returning to FIG. 1, in this example compression is based on a dictionary 112 maintained at the client 102 and a per-client dictionary 114 maintained at the server 104 (corresponding to this client 102). In general and as described below, instead of directly sending content, the sender's compression service (e.g., the service 106 of the client 102) locates content that is believed to be maintained in the receiver's dictionary (e.g., the client dictionary 114 of the server 104); (dictionary synchronization is described below). When matching content is located, a reference to content that is in the sender's dictionary (e.g., 112) is placed in the transmission packet in place of the actual content, thereby significantly reducing the amount of data that needs to be transmitted over the data channel 116.

The receiver's compression service (e.g., 108) receives the compressed packet and recreates the content by looking it up in its client dictionary (e.g., 114). As can be appreciated, by sending references to content instead of the actual content, many data transmissions may save significant bandwidth, at the cost of some processing overhead and dictionary storage. In general, end-to-end compression provides potentially better compression for smaller matches as the dictionary is likely to be more relevant.

Figure 3:
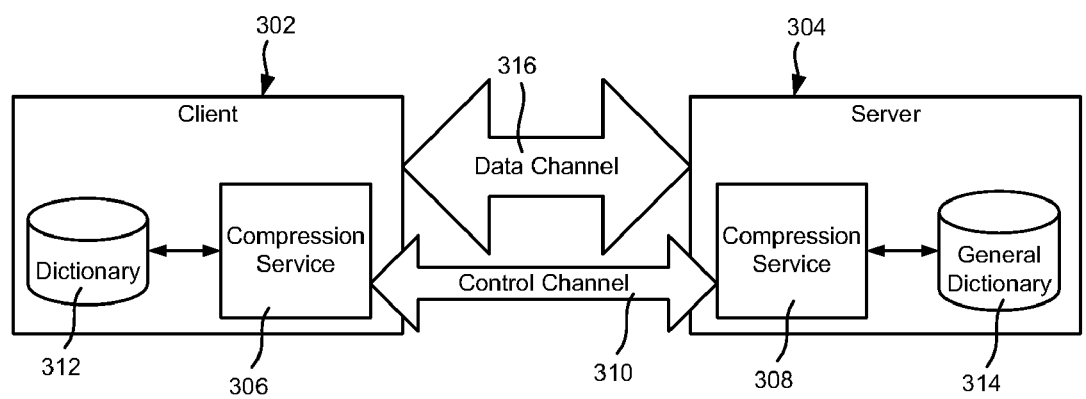
FIG. 3 is a block diagram representing example components for implementing content compression in networks in which a client sends compression-related data to a server that accesses a dictionary to perform decompression.

FIG. 3 provides a different compression example that is based on a speculative compression mechanism, further described below. In this example, the client 302 is the sender, and the server 304 the receiver. Instead of sending certain content, when that content is speculated to possibly be maintained in the receiver's dictionary 314, the sender's compression service 306 replaces the actual content with a hash (data chunk fingerprint) that represents that likely-maintained content. The fingerprint may be computed for each data chunk, or as described below with reference to FIG. 7, may be determined via an optional data chunk fingerprint table 312.

The receiver's compression service 308 attempts to locate the content in a general (e.g., multiple client) dictionary 314 via the data chunk fingerprint, and if found, recreates the content via the data chunk fingerprint. If not found, the receiver requests the actual content be sent from the sender. As can be readily appreciated, this speculative compression mechanism avoids having a dictionary for each client to which a server provides content, however additional communications are required when any fingerprinted content is not present at the receiver.

Figure 4:
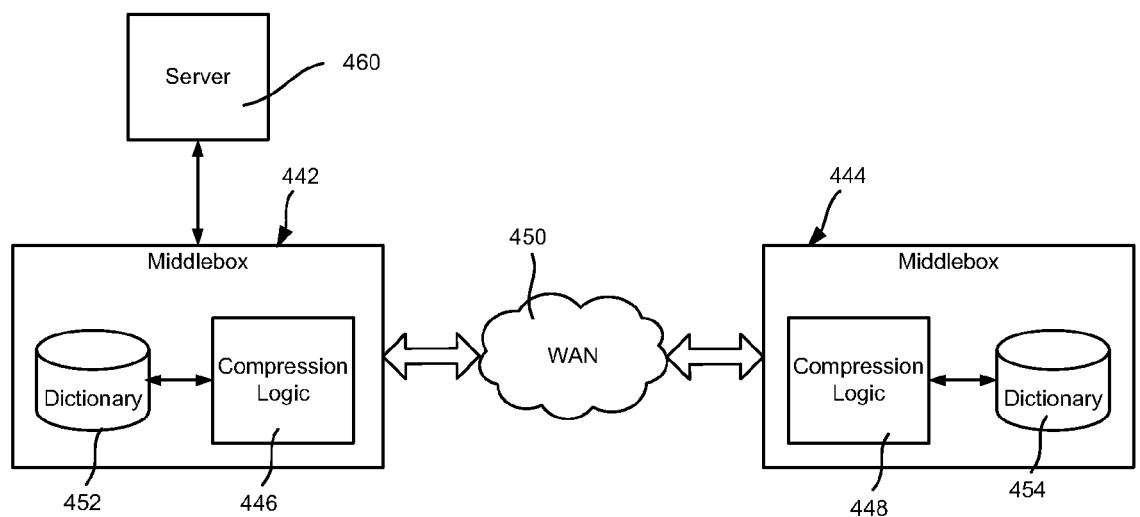
FIG. 4 is a block diagram representing example components for implementing content compression in networks in which middleboxes perform compression and decompression.

FIG. 4 is a representation of network content compression when used in middlebox compression devices 442 and 444, such as before and after a WAN 450. The middleboxes shown in FIG. 4 represent any suitable device, such as an appliance dedicated to compression, a router, some combination thereof, and so forth. As in the example of FIG. 1, compression is based on compression logic 446 and 448 and respective dictionaries 452 and 454 maintained at their respective middleboxes. However, as described below, dictionary lookups with middleboxes may be by hash values rather than by <offset,len> lookups.

In general, middlebox compression works when there is some, even small, similarity between users behind the same middlebox. Redundancy across such users provides a gain over simply processing each separately (weighted average). In addition to leveraging redundancy across users, middlebox compression is scalable to large number of users, and a larger dictionary (e.g., maintained in a disk) can help effectively compress very large downloads. Note that middlebox compression may be used in conjunction with client-server host compression.

Figure 5:
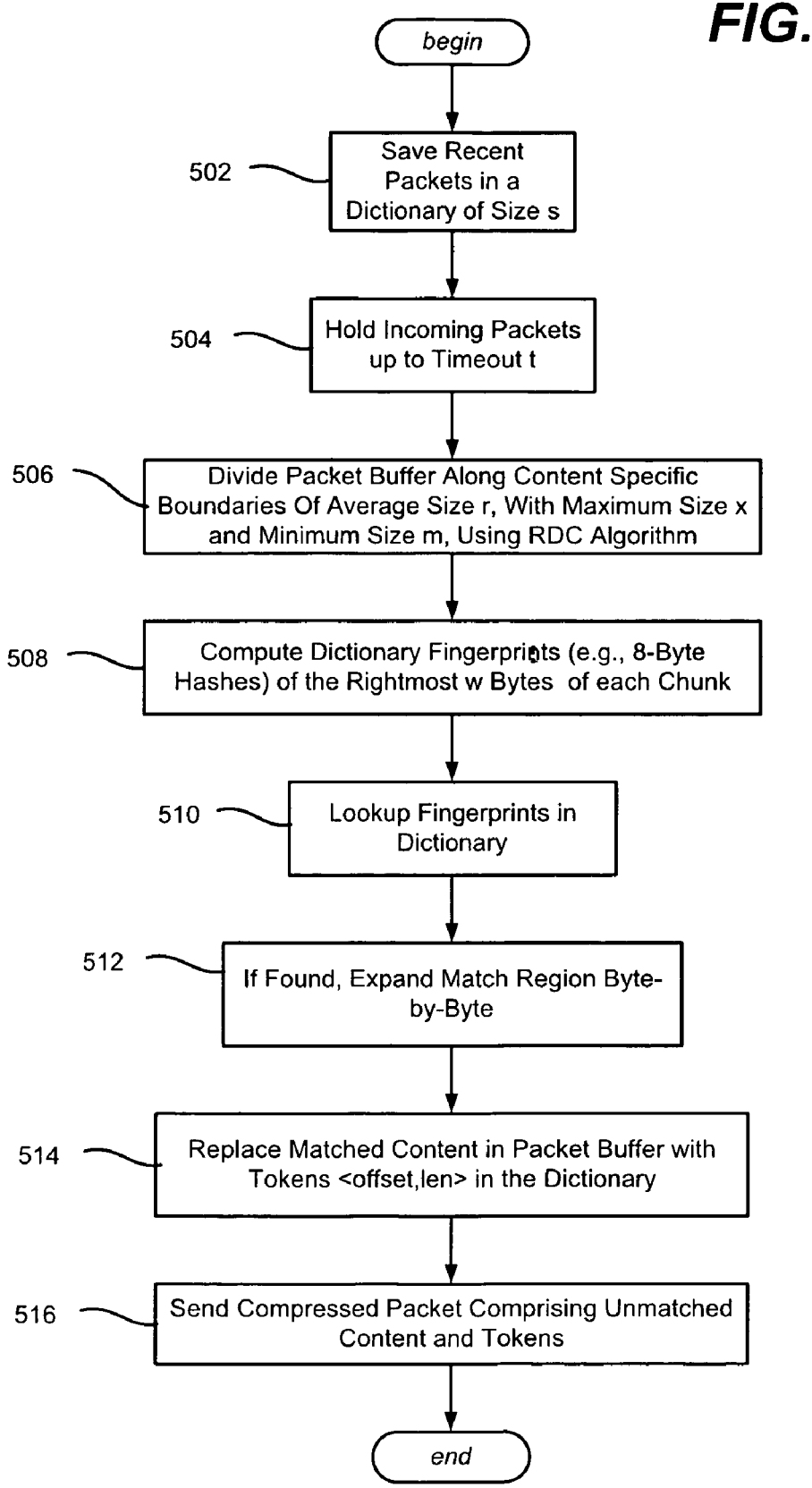
FIG. 5 is a flow diagram representing general logic that may be used in performing RDC* content compression.

Turning to various RDC* compression-related aspects, FIG. 5 represents general logic to compress content for network transmission, beginning at step 502 which represents saving recently-sent packets in a dictionary of some size s. Step 504 represents holding incoming packets up to some timeout time t, to allow for collecting multiple packets before compressing.

Step 506 divides the packet buffer along content-specific boundaries of average size r and step 508 computes dictionary fingerprints (e.g., 8-byte hashes) of chunks of size w to find matching content on the local dictionary (which is assumed to be synchronized with the receiver's dictionary). Step 510 looks up the dictionary fingerprints in the dictionary.

If found in the dictionary, an attempt is made to expand the match region, e.g., byte-by-byte, as represented by step 512. At step 514, any matched content is replaced in the packet buffer, such as with tokens of <offset,len> corresponding to the location and size in the sender's dictionary. Unmatched content, if any, is left as is in the packet, although it is feasible to use different compression (e.g., LZ compression) on the unmatched content as long as the receiver differentiates the dictionary matched versus unmatched types. Note that LZ compression may be used in addition to RDC* and/or speculative compression (described below), as LZ compression is generally orthogonal and can help improve RDC* and/or speculative compression.

Step 516 sends the packet, such as a compressed packet comprising tokens and any unmatched content. As can be appreciated, the payload of a compressed packet may contain only tokens or a combination of tokens and unmatched content, and some packets may be sent without compression if no matching content is found in the dictionary.

Figure 6:
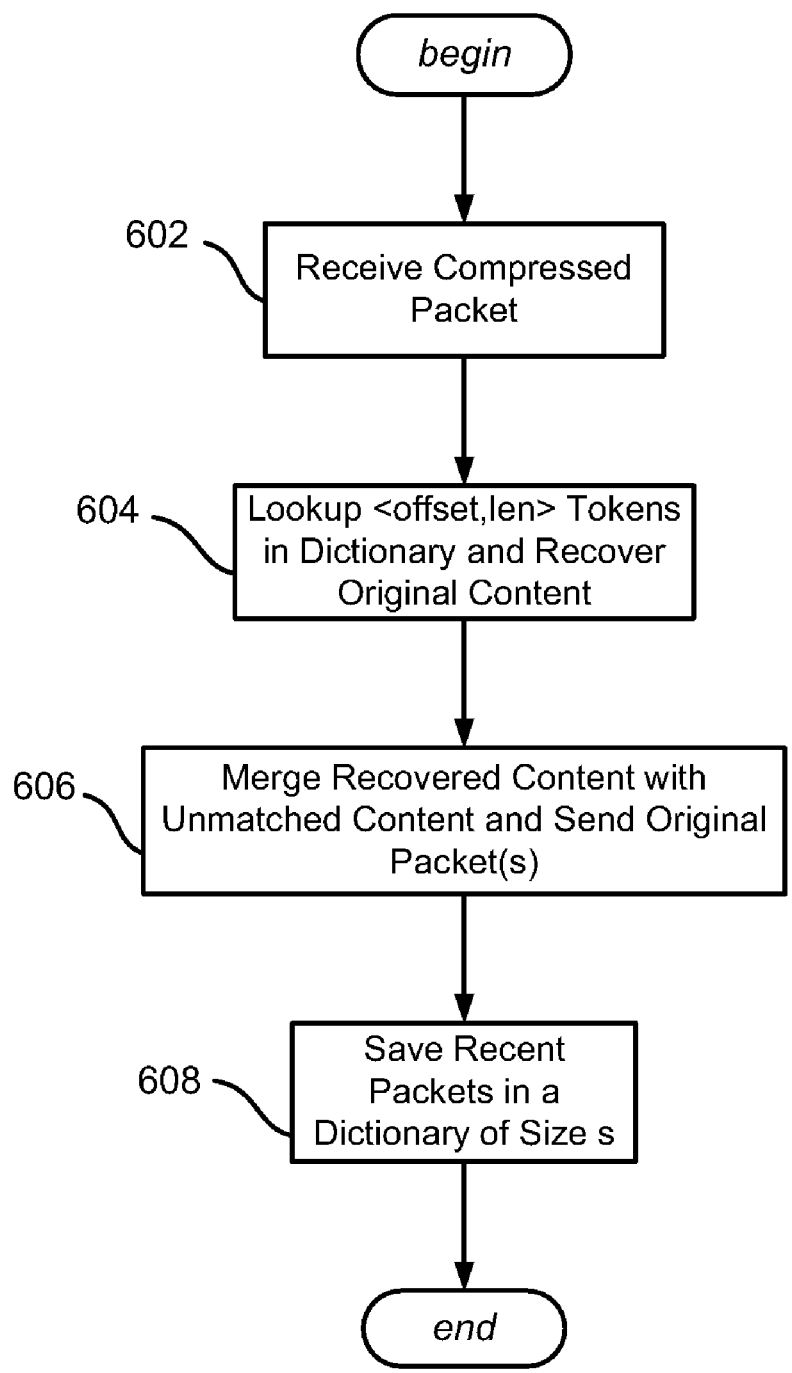
FIG. 6 is a flow diagram representing general logic that may be used in performing RDC* content decompression.

Turning to various RDC* decompression-related aspects, FIG. 6 represents general logic to decompress content sent in a compressed packet, beginning at step 602 which represents receiving a compressed packet.

Step 604 looks up the packet's <offset,len> tokens in the receiver's dictionary, and recovers the original content that matches each token. Step 606 represents merging the recovered content with any unmatched content in the packet, and sending the original packet or packets to a further recipient. Step 608 represents saving recently-sent (or frequently-sent) packets in the receiver dictionary of some size s.

Figure 7:
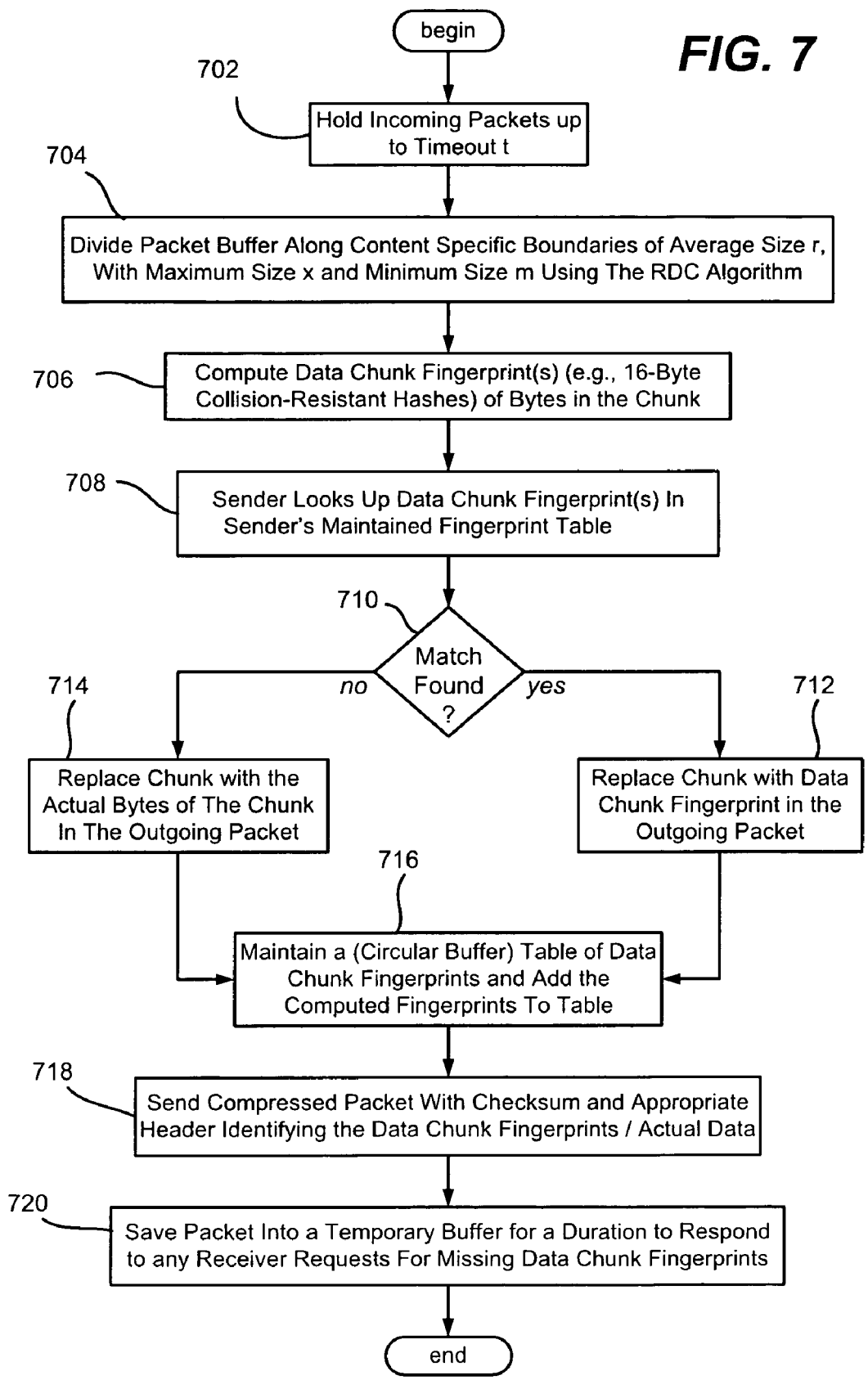
FIG. 7 is a flow diagram representing general logic that may be used in performing speculative content compression with a sender dictionary.
Figure 8:
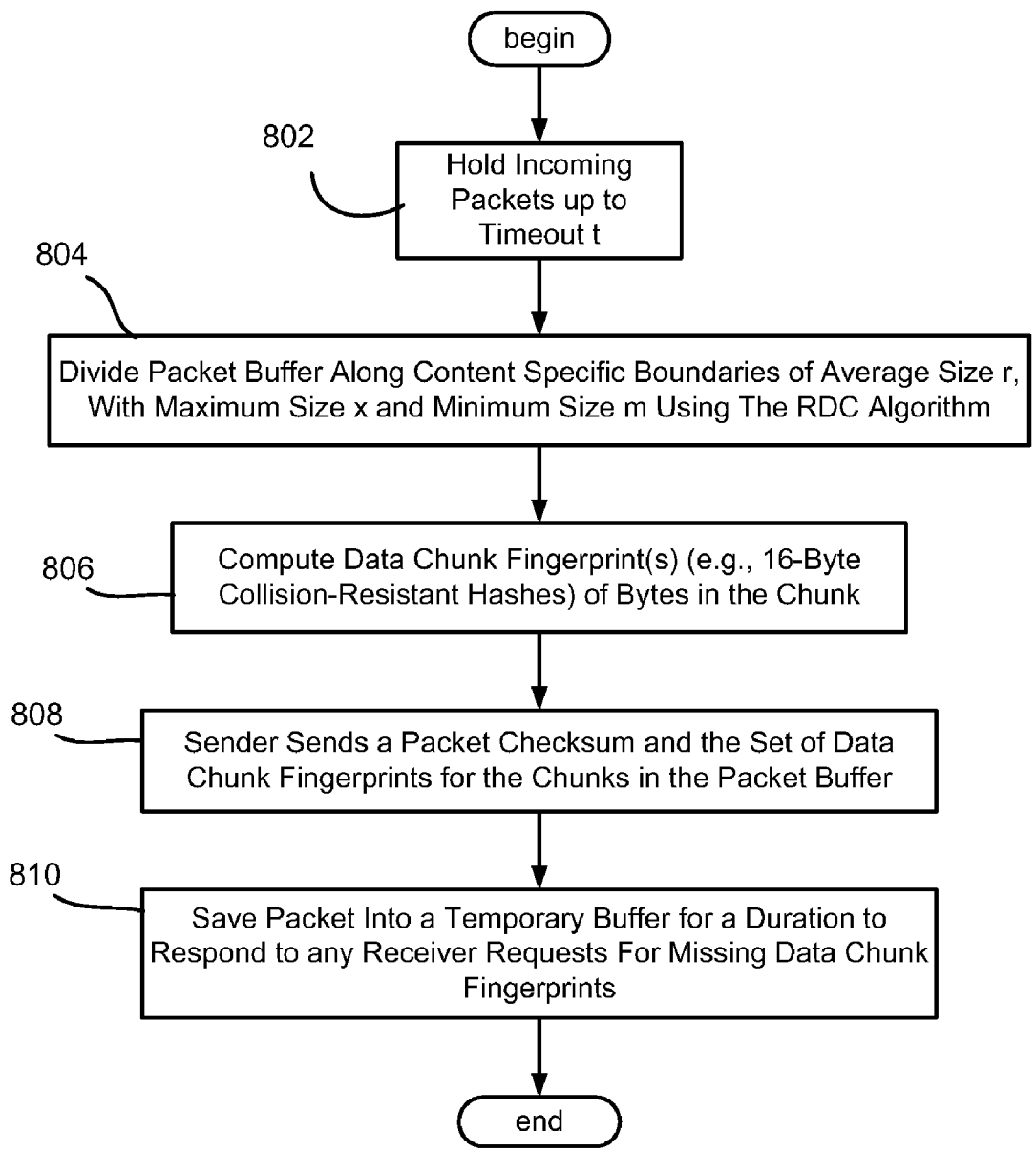
FIG. 8 is a flow diagram representing general logic that may be used in performing speculative content compression.
Figure 9:
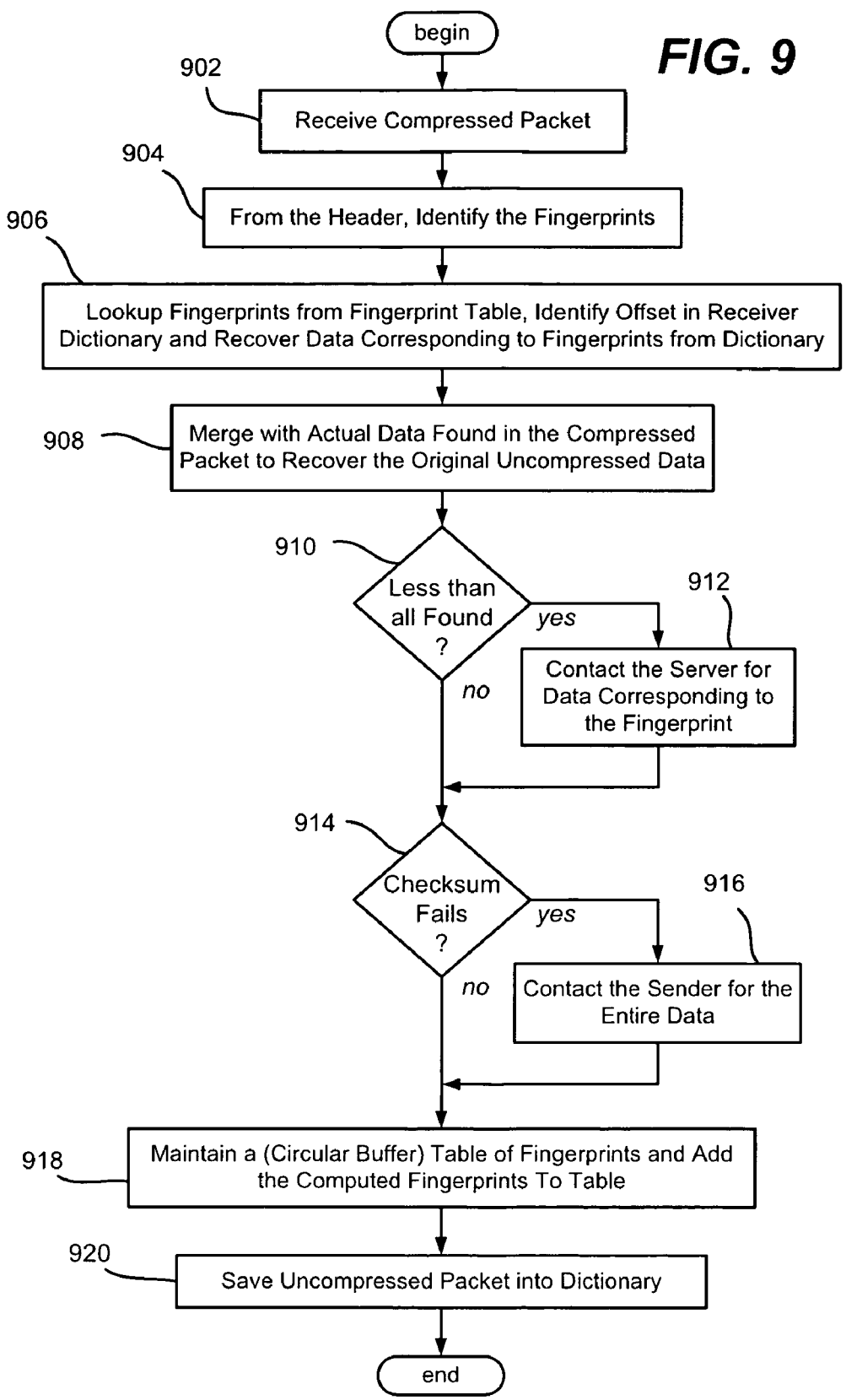
FIG. 9 is a flow diagram representing general logic that may be used in performing speculative content decompression.

FIGS. 7-9 represent various aspects related to speculative compression, in which FIG. 7 exemplifies speculative compression when the sender maintains a data chunk fingerprint table, and FIG. 8 when the sender does not; FIG. 9 exemplifies speculative decompression. Note that for speculative compression, the sender does not maintain a dictionary, and (unlike an RDC* dictionary fingerprint) a data chunk fingerprint is computed over a chunk of data to send.

Thus, in FIG. 7, step 702 represents holding incoming packets up to a timeout time t; this allows collecting multiple packets before compression. Step 704 divides the packet buffer along content specific boundaries of average size r, with maximum size x and minimum size m, using the RDC algorithm. Step 706 computes the data chunk fingerprints (e.g. 16-byte collision-resistant hashes) of the bytes in the chunk.

Continuing with the example of FIG. 7, (in which the sender maintains a fingerprint table), at step 708 the compression mechanism looks for matching fingerprints in this table. If a match is found (step 710), at step 712 the compression mechanism replaces the chunk with a data chunk fingerprint in the outgoing packet. If instead a match is not found at step 710, the actual bytes of the chunk are placed as appropriate in the outgoing packet, as represented by step 714. Step 716 represents maintaining the data chunk fingerprint table (e.g., a circular buffer), including adding the computed data chunk fingerprints to this table.

Step 718 represents sending the compressed packet, e.g., with a checksum and an appropriate header identifying the data chunk fingerprints and actual data. At step 720, the packet is then saved into a temporary buffer or the like, e.g., for a small duration, in order to respond to receiver requests for missing fingerprints, (if any).

FIG. 8 is an example flow diagram representing example steps in an environment in which the sender does not maintain a data chunk fingerprint table. In this example, steps 802, 804 and 806 are analogous to steps 702, 704 and 706 of FIG. 7; e.g., step 802 represents holding incoming packets up to a timeout time t, step 804 divides the packet buffer along content specific boundaries of average size r, with maximum size x and minimum size m, using the RDC algorithm, and step 806 computes the data chunk fingerprints (e.g. 16-byte collision-resistant hashes) for the data in the chunk.

At step 808, the sender sends a packet checksum and the set of data chunk fingerprints for the chunks in the packet buffer. At step 810, the packet is then saved into a temporary buffer or the like, e.g., for a small duration, in order to respond to receiver requests for missing fingerprints, (if any).

FIG. 9 represents the receiver performing speculative decompression, beginning at step 902 which represents receiving the compressed packet. Using the header information, step 904 identifies the data chunk fingerprints, and step 906 uses the data chunk fingerprints to attempt to look up matching data chunk fingerprints in the receiver's data chunk fingerprint table, so as to identify the fingerprint's corresponding offset in the receiver's dictionary and thereby recover the data corresponding to the data chunk fingerprints from the receiver dictionary. Step 908 represents merging the recovered data with any actual data found in the compressed packet to recover the original uncompressed data.

Step 910 evaluates whether any data is still needed. More particularly, if at step 910 one or more data chunk fingerprints were not found in the receiver's table (which is likely, especially when Sender does not maintain a sender-side fingerprint table), at step 912 the receiver contacts the server for data corresponding to the data chunk fingerprint.

Further, the checksum in the header is evaluated against the decompressed data at step 914. If the checksum comparison fails (e.g., due to a data chunk fingerprint collision), at step 916 the receiver contacts the sender for the entire data.

Step 918 represents the receiver maintaining its table of data chunk fingerprints (e.g., a circular buffer) including adding the data chunk fingerprints from this packet to this table. Step 920 saves the uncompressed packet into the dictionary for possible use in subsequent decompression operations.

To summarize, in speculative compression, the sender does not have a dictionary, and instead may send computed hashes. The lookup is by data chunk fingerprint (hash), and if not matched at the receiver results in a request back to the sender to send actual content. Once the packet is complete via resending, reconstruction and/or merging, the packet represents the original content and may be sent to a further recipient.

As can be readily appreciated, various technical aspects may be used when implementing compression. Consider a model where two compression boxes, such as the middlebox devices 442 and 444 of FIG. 4, are at either end of a WAN link 450 such that the middlebox 442 knows what traffic it has sent to the middlebox 444 and vice versa. In this example, both the middlebox 442 and the middlebox 444 maintain a compression dictionary 452 and 454, respectively, comprising the payloads of packets previously exchanged over the link. Under the assumption that there is no packet loss or that lost packets are retransmitted, the dictionaries 452 and 454 remain synchronized. Each dictionary is divided into "chunks", with chunk boundaries determined by content rather than location. A hash value is computed for each chunk, and these are stored in a dictionary table.

Upon the arrival of incoming packet or packets of a flow, the middlebox 442 divides the payload into "chunks", computes its hash or hashes and performs a lookup of the hash or hashes in the dictionary hash table. If the lookup finds a hash match (i.e., the corresponding chunk is redundant), the middlebox 442 tries to extend the size of the match by doing a byte-by-byte comparison of the payload with the matched dictionary content, and replaces the maximal redundant payload with a size and an offset into the dictionary; non-redundant data is sent as is. The middlebox 444 reconstructs the payload using its dictionary 454 before forwarding the packet or packets on to the next recipient.

While the above model describes a compression dictionary that is maintained reactively (e.g., by caching traffic as it flows in normal course), such a dictionary can also be maintained proactively. For example, when there is spare bandwidth, such as during nonpeak hours, the dictionary may be pre-populated with content that may potentially improve the effectiveness of compression at a later time.

Moreover, spare bandwidth in the reverse direction of traffic flow may be exploited. For example, if traffic mostly flows from the middlebox 442 to the middlebox 444, spare bandwidth in the reverse direction may be used by the middlebox 444 to pre-populate the middlebox's dictionary 452 with content that may help the middlebox 442 compress better. Such opportunities may arise in branch office settings where much of the data transfer may be from the headquarters to the branch, even though the WAN link bandwidth is symmetric.

Turning to an explanation of one suitable compression algorithm, namely "RDC*" as referred to herein, for various chunks of data, chunk boundaries are chosen by a local maxima over a horizon of r bytes; (note that since the choice is local, this approach can guarantee uniform distribution of chunks).

The RDC* compression mechanism computes an (e.g., eight-byte) hash of w bytes (minimum match size) at the chunk boundary to store, as a complete chunk match is not needed, only an index into the dictionary. This is particularly useful when the chunk size is large. Note that the chunk size may be adaptively determined to improve compression speed, in that a larger r results in a higher compression speed, but lower compression savings.

In order to improve compression speed, chunking/hash computation and lookup times are minimized to the extent possible. Chunking/hashing may make use of Rabin fingerprinting for efficiency, and faster lookups may be facilitated by efficient data structures. In an environment in which compression is only a best-effort service, the compression engine can be designed to forward packets with whatever compression it is able to achieve within a given deadline. An algorithm to dynamically adapt the deadline based on the current compression efficiency and the bandwidth/traffic on the supported links may be implemented.

As generally described above with reference to FIG. 3, another compression algorithm is speculative compression. Speculative compression divides a packet buffer into content-based chunks of average size r bytes, and using RDC, computes their (e.g., 16-byte) hashes, and sends these hashes from the sender (e.g., the client 302) to a receiver (e.g., the server 304). The receiver matches hashes with its hash dictionary 314 and only requests chunks that it does not already have. Note that the sender may optionally maintain a table of past hashes that the receiver claimed to have or is likely to have, and only replace data with hashes for these. As mentioned above, while this approach alleviates the burden of maintaining a dictionary per receiver at the sending node, the compression efficiency is lower as it is limited to finding redundancy at the granularity of chunks (the byte-by-byte match extension cannot be performed), and adds an extra round-trip in the event of a miss in the dictionary. Note that this approach operates over a packet buffer.

For speculative compression, one suitable example system used a dictionary size of 10MB (at the receiver only), a timeout value of 10 ms, with average chunk sizes that varied from 64-2048 bytes, and a 16-byte chunk hash. A dynamic chunk sizing algorithm may be used to help optimize compression savings for different situations. Note again that while speculative compression does not deliver the same gains as RDC* or SW00(described below), it is more scalable since the sender does not need to maintain a dictionary.

Other compression algorithms are feasible. For example, SW00(N. Spring and D. Weatherall, "*A protocol-independent technique for eliminating redundant network traffic*," SIGCOMM, September 2000), computes 8-byte Rabin hashes over a sliding window of w bytes (minimum match size) and chooses content-based chunks by selecting a subset of hashes r that match a particular pattern. However, because packet content is not uniformly random, chunks are not uniformly distributed, reducing compression savings.

LZ-based compression is also feasible. Implementation of the LZ compression algorithm (xpress) may be provided on each packet buffer (with no packet history-based dictionaries). Note that mail traffic is SSL encrypted, but unlike LZ, dictionary-based schemes still achieve some compression; compression before SSL encryption yields even better savings.

Buffering has little impact on the compression savings in dictionary-based compression (SW00 or RDC*). More particularly, because the minimum match unit w is small (32 bytes), larger buffers do not help materially improve compression. For a larger w, buffering does help, but overall compression savings decrease. LZ compression sees significant improvement with buffering. Speculative compression sees some improvement with buffering but overall compression gains are lower than with SW00 or RDC.

In general, larger compression savings results in slower compression speed and larger overhead. Compression speed may vary between a few Mbps to few hundred Mbps. An adaptive algorithm that tunes the compression speed based on traffic load delivers improved performance. An adaptive algorithm can thus keep up with varying input traffic data rates.

Figure 10:
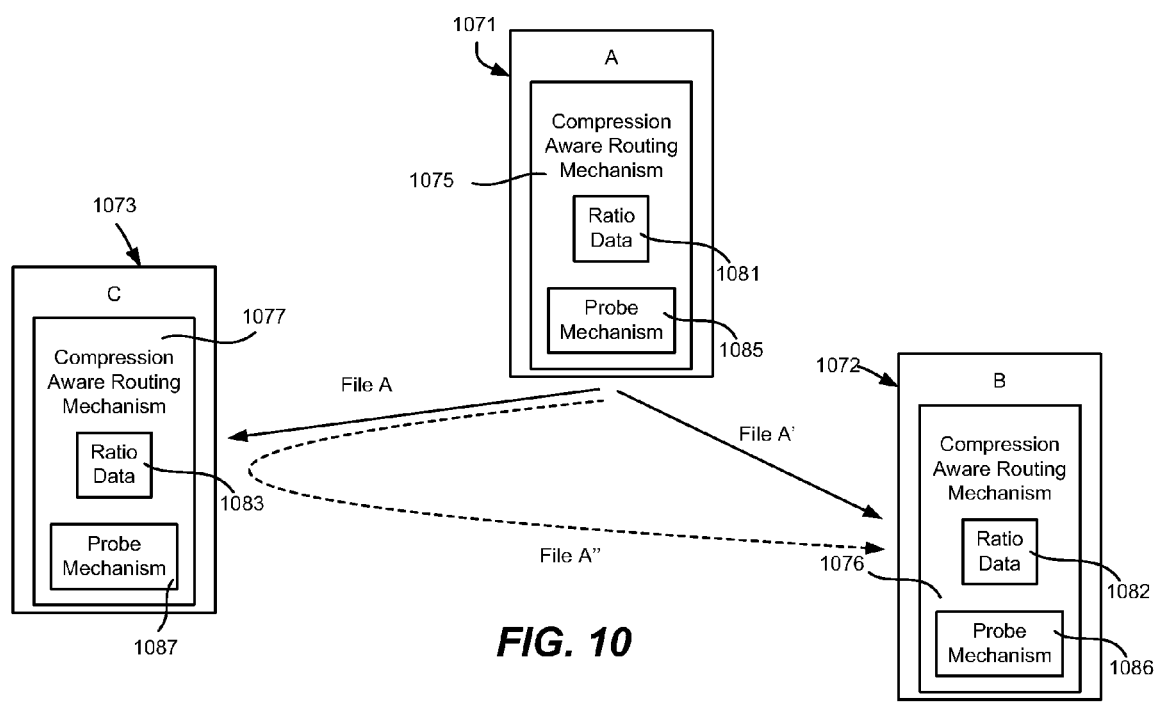
FIG. 10 is a block diagram representing example components for implementing compression-aware routing.

Another aspect is directed towards compression-aware routing, which in general considers compression state when routing data, rather than considering the shortest routing path, for example. For example, as generally represented in FIG. 10 in servers 1071-1073, compression aware routing mechanisms (1075-1077, respectively) can consider compression state when routing data. Compression state provides a content-agnostic solution based on (e.g., average) compression ratios (ratio data 1081-1083, respectively), and/or a content-aware solution based on hash probes (probe mechanisms 1085-1087, respectively).

More particularly, with respect to routing, conventional approaches optimize compression efficiency over all links at a single node, rather than optimize the performance of an end-to-end path. In contrast, as described herein, one compression-aware routing protocol that takes end-to-end compression efficiency into account provides a content-agnostic solution by maintaining a compression ratio metric (ratio data 1081-1083) at each compression-enabled link (1071-1073, respectively), which is then fed into traditional or other routing algorithms. In this way, traditional routing metrics are enhanced by using average compression savings achieved according to past history.

However, compression efficiency may be highly dependent on the content of a flow rather than average compression statistics of a link. Thus, a content-aware solution for long-lived flows may be used to route the flow along one path and via probe mechanisms 1085-1087 send probe packets along other paths to the same destination. For example, the probe packets may contain a set of content chunk hashes of the flow seen thus far. Such probe packets with content hashes may be along multiple paths to the destination, with the path with the "best" matches chosen for routing. In this manner, each compression node along the end-to-end path can estimate the compression efficiency for the flow on its next-hop, based on the number of hashes in the probe packet that matches its dictionary, and append this information to the probe packets. Comparing the information from multiple nodes, the source then makes a decision on whether/where to reroute the flow.

Overlay routing in enterprise network-level content compression provides opportunities for efficiency gains via overlay routing on a mesh of compression nodes. In one implementation, compression happens point-to-point, whether between two middleboxes, two end hosts, or a middlebox and an end host. While straightforward, this may not scale because of the expense of maintaining pair-wise dictionaries between such nodes in the network.

Thus, one alternative is to treat the network of compression boxes as a mesh. Depending on the dictionary state, an overlay path across this network of boxes may yield a much higher degree of compression than the direct point-to-point link, as in the example of FIG. 10, described below. Doing so requires an overlay routing protocol that is compression-aware. In point-to-multipoint or mesh settings, however, having a dictionary per link is not scalable. One option is to perform peer-assisted compression, i.e., send pointers to chunks held by a peer of the target that it is well connected to (e.g., a host on the same home/campus network).

By way of example, consider FIG. 10, in which an enterprise has a European office in Amsterdam (server 1071, or A), an Indian office in Bangalore (server 1072, or B), and its U.S. headquarters in Chicago (1073, or C). Assume that point-to-point compression is deployed between each pair of sites. While the low volume of communication between two nodes, e.g., server A 1071 and server B 1072 may limit the richness of their shared dictionary, and hence the effectiveness of compression, if each of server A 1071 and server B 1072 share a far richer dictionary with server C 1073, sending content from server A 1071 to server C 1073 to server B 1072 rather than from server A 1071 to server B 1072 may provide more opportunities for sending pointers instead of actual data blocks. Thus, it may be determined to be more efficient to send content (file A'', as indicated by the dashed, curved arrow) from the server A 1071 to the server C 1073 to the server B 1072 rather than from the server A 1071 directly to the server B 1072.

Figure 11:
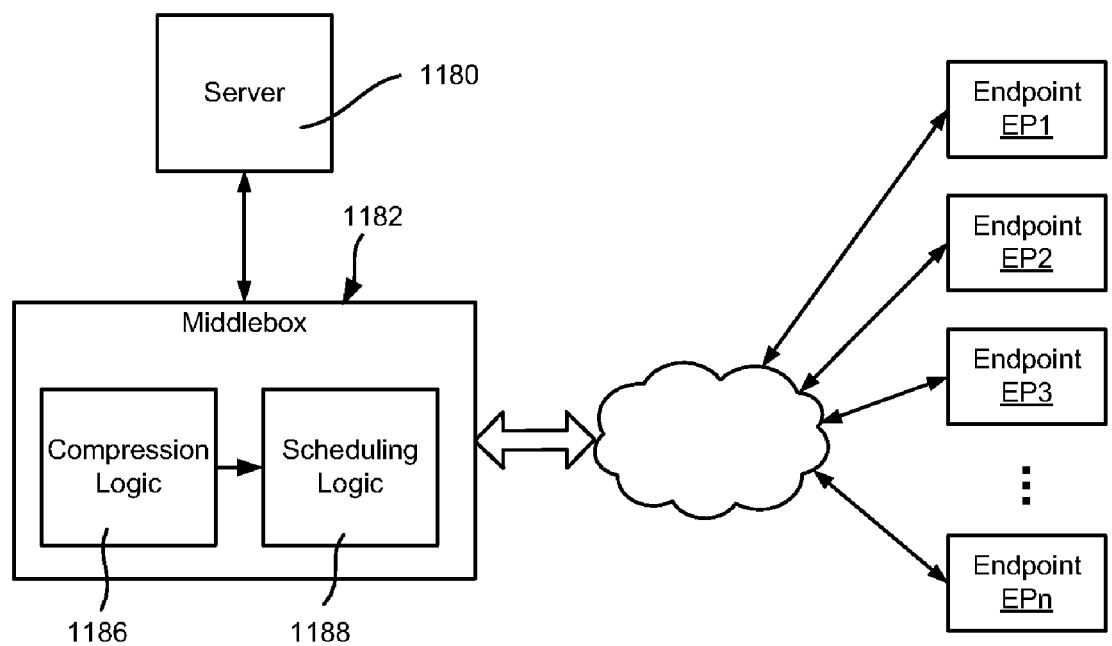
FIG. 11 is a block diagram representing example components for implementing packet scheduling and fairness.

Turning to aspects related to packet scheduling and fairness, prior solutions simply perform compression on the contents of the packet at the head of the queue. While such an approach is simple and allows compression to be implemented independently from scheduling, it does not maximize throughput. Instead, as described herein, by applying traditional or other scheduling metrics (e.g. deficit round robin) after compression (rather than before) WAN bandwidth is shared more equally. FIG. 11 represents such a concept.

For example, a compression-aware scheduling algorithm may maximize ingress throughput at the source compression box by selecting, at each scheduling instant, the packet or packets of the flow with the highest redundancy. However, this approach will starve flows that have little redundancy in their payload. A better scheduling algorithm thus trades off compression efficiency with throughput fairness among flows.

By way of example, consider a source server 1180 end-to-middlebox compression service as in FIG. 11 where the middlebox 1182 has multiple endpoints EP1-EPn connected to it. In this case, the middlebox 1182 wants to schedule the flows to the different endpoints EP1-EPn in a fair manner. Unlike prior solutions that perform the compression after a well-known scheduling algorithm to choose, as represented in FIG. 11, compression logic 1186 performs the compression before scheduling by scheduling logic 1188 (e.g., running a well-known scheduling algorithm), resulting in more fair scheduling.

Compression efficiency may be improved by enlarging the size of the dictionary maintained in a two-tier storage system. In such an event, the replacement policy used in maintaining the relevant chunks in the RAM also has a bearing on fairness. For example, keeping chunks with the highest usage-based reference count in the RAM maximizes compression, but may result in unfairness to flows whose chunks are not as used. In one mechanism, the replacement policy may try to maximize the hit rate (and hence throughput) and let scheduling handle throughput fairness independently. Alternatively, the replacement policy may also consider fairness, e.g., by giving each flow some RAM space regardless of current usage data.

Congestion control is another consideration that occurs as a result of content compression. Smoothing techniques may be applied such as with respect to adding jitter to ACKs, and/or maintaining TCP congestion window-based growth between compression nodes.

Figure 12:
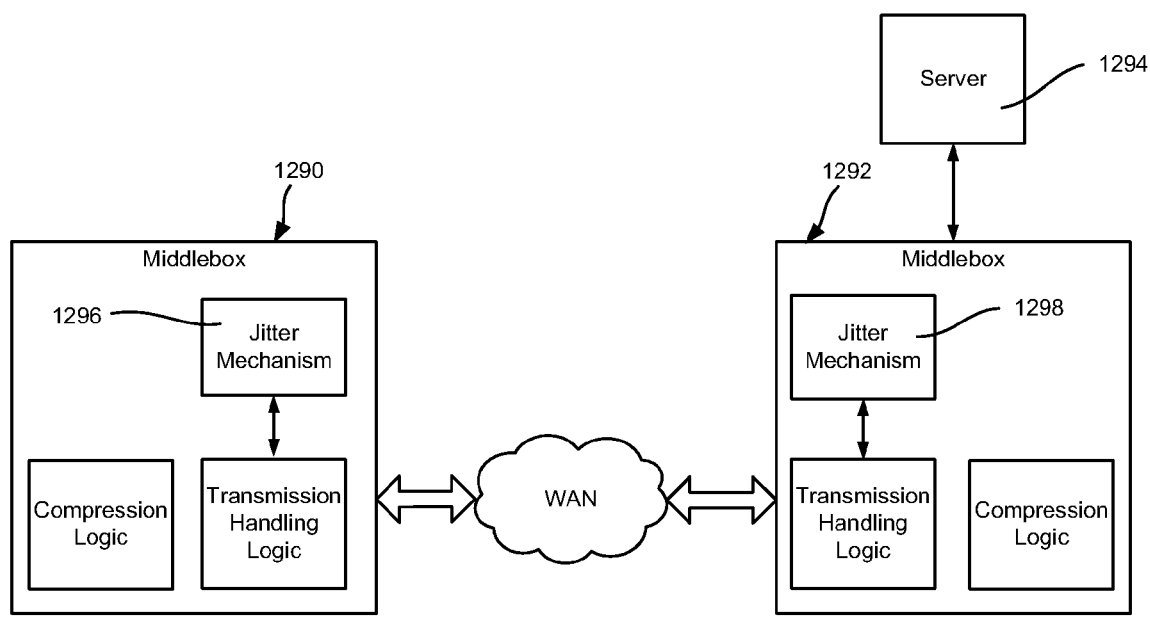
FIG. 12 is a block diagram representing example components for implementing

More particularly, compression inherently changes the per-flow resource usage characteristics in the network. Consider an end-to-end TCP flow that spans two middleboxes 1290 and 1292 implementing transparent compression over the WAN, such as generally represented in FIG. 12. Assume that one of the links in the WAN is a bottleneck link. If the flow is highly compressible, it uses significantly less bandwidth over the compression-enabled path. However, TCP at an end-host (e.g., the server 1294), which is oblivious to this compression, perceives the availability of much more bandwidth across the bottleneck link than the flow actually uses. This causes the flow's congestion window size to grow much larger than it would have under normal operation with no compression. After a period of high compressibility, if this flow encounters data that is highly incompressible, this inflated congestion window results in the sender dumping of a burst of traffic into the network, which may result in heavy packet loss, not only for this flow but also for other flows that share the same bottleneck link or links. In other words, as a flow encounters incompressible content, it sends a large burst of traffic onto the WAN. Such a sudden burst from one flow causes multiple packet losses for a competing flow, and significant drops in its congestion window.

Thus, traffic shaping mechanisms at the middleboxes 1290 and 1292 may be provided to smooth out such bursts, e.g., like TCP trunking implemented between the middleboxes to alleviate the impact on competing flows. For example, a jitter mechanism 1296 and 1298 at each middlebox 1290 and 1292, respectively, may add a jitter to the TCP ACKs, and thereby reduce the burstiness of the traffic and improve performance. Note however, the compressed flow may still suffer from a perceived sudden "drop" in bandwidth, resulting in timeouts and poor performance.

Various architectural choices for a content compression system may be implemented. For example, as set forth above with reference to FIGS. 1-4, middlebox and end-host based content compression may occur in a middlebox within the network, on end hosts, or in some combination. As in FIG. 4, a middlebox such as a WAN accelerator appliance may be deployed at each end of a WAN link so that the pair of boxes compresses the traffic that traverses the link. This has the advantage that the deployment of a single pair of boxes could potentially cover a large set of hosts that straddles a single bottleneck link. Furthermore, the middleboxes can leverage redundancy across users, thereby improving the effectiveness of compression.

In contrast, an end host-based approach implements compression functionality as software running on end hosts, eliminating the need for separate compression appliances. End-host-based compression may be applied to any combination of client-server and peer-to-peer traffic provided the hosts involved support compression. However, it may be too expensive for a host to maintain perfectly synchronized dictionaries with a large number of other hosts, whereby the compression algorithm may need to work with imperfect information, as in speculative compression. Further, unlike middlebox compression, end-to-end compression can be performed even when traffic is encrypted end-to-end through appropriate hooks into the end-host stack (e.g., a generic compression-aware socket layer as in FIG. 2). In general, both the middlebox-based and end-host based approaches can coexist, and in fact a combination of the two may be appropriate, as seen in the "last-mile" bottleneck scenario described herein.

When compression occurs in middleboxes, alternatives include that the middleboxes may compress traffic transparently, or may instead operate as a proxy that participates in the end-to-end protocol, even if not apparent to the end hosts. Transparency has the advantage that it does not alter the semantics of end-to-end protocols; the compression middlebox at one end transmits a condensed version of the packets to its counterpart, which restores and forwards the original packets. The compression boxes do not maintain any hard state; if a box dies, traffic is short-circuited around it.

Alternatively, in the proxy-based approach, the local middlebox acknowledges (TCP) traffic on behalf of the remote end. The middlebox thus accumulates packets, which are then compressed and transmitted across to its counterpart over a separate TCP connection. The middlebox at the remote end decompresses and forwards the data stream to the destination host or hosts over a separate TCP connection or connections. This approach allows buffering a large volume of traffic, thereby potentially improving compression effectiveness. However, acknowledgment (ACK) spoofing means that the middleboxes hold hard state, which impacts end-to-end TCP in the case of a middlebox crash. While transparency is generally an architecturally cleaner solution, the middlebox needs to mitigate issues such as traffic burstiness, as described herein.

Note that in general, the example traffic being compressed runs over TCP. TCP aids compression by helping keep the dictionaries at each end of a link synchronized, even in the presence of packet reordering or loss. However, compression may work on non-TCP traffic, which may become significant in the future (e.g., congestion-controlled UDP for streaming media). A straightforward solution is to add a meta header, containing a sequence number, to any packets exchanged between the middleboxes, and retransmit packets to recover from losses. Alternatively, the speculative compression technique may be used on individual packets or groups of packets. Even if the dictionaries at the two ends are not perfectly synchronized, they are mostly synchronized (assuming packet loss and reordering is rare), whereby speculative compression may be quite effective.

Another content compression aspect is related to dictionary size, which need not be small fixed size dictionaries that are updated in a FIFO manner by the incoming packets. Increasing the size of the dictionary generally results in improved compression. One approach to scale the size of the dictionary even further, e.g., to 1TB or more, is to use hierarchical storage for the dictionary. The compression engine keeps the most relevant chunks, which are used for compression, as a "cache" in the RAM, while storing the remainder of the chunks on disk based on the expectation that it might become relevant in the future. Such an approach uses compression-aware memory management algorithms to optimally choose which chunks to keep in RAM and which to evict, e.g., based on reference counts such as how frequently each chunk has aided compression.

As can be appreciated, content compression provides a number of benefits and applies to various scenarios. For example, a "flash crowd" usually results from the sudden popularity of a small subset of data hosted at a server, and is thus a good match for content compression where a server is delivering identical content to many clients. Although the clients download content using unicast, oblivious to content compression, compression on the access link between the server 460 (FIG. 4) and its access router (middlebox 442) ensures that a full copy is transmitted only once. Subsequent transmissions only involve the transfer of pointers, resulting in significant bandwidth savings. Note that unlike application-level caching, content compression at the network level helps regardless of the nature of the flash crowd (web content, streaming media, and so forth).

Time-shifted multicast also benefits from the widespread deployment of compression at network links, that is, to automatically enable a configuration free, efficient, time-shifted multicast service. Consider a server delivering identical content to multiple clients, with only one copy of the content being transferred between the server and a router, such as in FIG. 4. In turn, the router sends a full copy of the content on each of its attached links during the first access on those links (through other routers), while subsequent accesses result only in the transfer of content pointers. Thus, this approach combines the simplicity, configuration-free nature, and short, direct paths of unicast with the bandwidth efficiency of native IP multicast, with the small overhead of the content pointers. Furthermore, unlike the synchronous operation of traditional IP multicast, compression remains effective as long as the time-shifted accesses happen before the relevant data is evicted from the dictionary. Although compression-based multicast can likely scale to interesting sizes while consistent with the simple unicast model, there remains a per-receiver overhead, even if small (e.g., the cost of transferring pointers), that limits indefinite scaling.

Another benefit is alleviating the "last-mile" bottleneck in which the last hop to clients is often a bandwidth bottleneck. The deployment of compression between the ISP POP and a client host (or a compression-enabled home router) helps alleviate this bottleneck. In addition to point-to-point compression, point-to-multipoint compression also may be leveraged in some settings, e.g., hosts within a home. For example, if two clients are on a high-speed LAN, a router may send a full copy of the content to one client and just send pointers when the other client subsequently requests the same content.

There are different issues pertaining to deployment of content compression in enterprise networks versus deployment in the wider Internet. In an enterprise, having compression, middleboxes under the same administrative control as clients and servers facilitates operation. For example, encrypted traffic, common in enterprise networks, is normally hard to compress. However, sharing the ephemeral session encryption keys with the (trusted) middleboxes allows getting around this problem. As another example, the middleboxes may preload dictionaries with content that normally requires user authentication (e.g., email), enabling compression at a later time when the content is actually accessed by the user.

Although in the wider Internet the lack of trust makes it challenging for middleboxes to compress encrypted traffic, compression also has a significant role, as such traffic is likely less dominant in a public Internet setting. In any event, such traffic is still amenable to end-host based compression techniques as described above.

Exemplary Operating Environment

Figure 13:
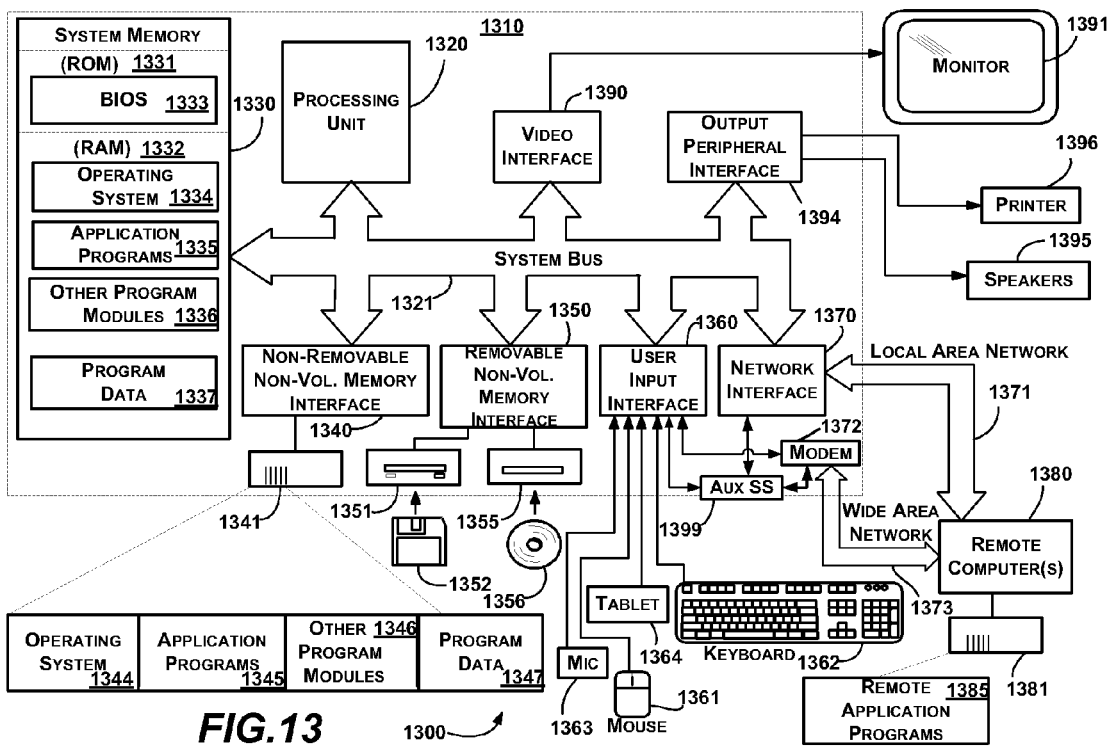
FIG. 13 shows an illustrative example of a computing environment into which various aspects of the present invention may be incorporated.

FIG. 13 illustrates an example of a suitable computing system environment 1300 on which the examples of FIGS. 1-12 (e.g., the client and/or servers) may be implemented. The computing system environment 1300 is only one example of a suitable computing environment and is not intended to suggest any limitation as to the scope of use or functionality of the invention. Neither should the computing environment 1300 be interpreted as having any dependency or requirement relating to any one or combination of components illustrated in the exemplary operating environment 1300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 13, an exemplary system for implementing various aspects of the invention may include a general purpose computing device in the form of a computer 1310. Components of the computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1310 typically includes a variety of computer-readable media. Computer-readable media can be any available media that can be accessed by the computer 1310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336 and program data 1337.

The computer 1310 may also include other removable/non-removable, volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media, described above and illustrated in FIG. 13, provide storage of computer-readable instructions, data structures, program modules and other data for the computer 1310. In FIG. 13, for example, hard disk drive 1341 is illustrated as storing operating system 1344, application programs 1345, other program modules 1346 and program data 1347. Note that these components can either be the same as or different from operating system 1334, application programs 1335, other program modules 1336, and program data 1337. Operating system 1344, application programs 1345, other program modules 1346, and program data 1347 are given different numbers herein to illustrate that, at a minimum, they are different copies. A user may enter commands and information into the computer 1310 through input devices such as a tablet, or electronic digitizer, 1364, a microphone 1363, a keyboard 1362 and pointing device 1361, commonly referred to as mouse, trackball or touch pad. Other input devices not shown in FIG. 13 may include a joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. The monitor 1391 may also be integrated with a touch-screen panel or the like. Note that the monitor and/or touch screen panel can be physically coupled to a housing in which the computing device 1310 is incorporated, such as in a tablet-type personal computer. In addition, computers such as the computing device 1310 may also include other peripheral output devices such as speakers 1395 and printer 1396, which may be connected through an output peripheral interface 1394 or the like.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include one or more local area networks (LAN) 1371 and one or more wide area networks (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360 or other appropriate mechanism. A wireless networking component 1374 such as comprising an interface and antenna may be coupled through a suitable device such as an access point or peer computer to a WAN or LAN. In a networked environment, program modules depicted relative to the computer 1310, or portions thereof, may be stored in the remote memory storage device. By way of example, and not limitation, FIG. 13 illustrates remote application programs 1385 as residing on memory device 1381. It may be appreciated that the network connections shown are exemplary and other means of establishing a communications link between the computers may be used.

An auxiliary subsystem 1399 (e.g., for auxiliary display of content) may be connected via the user interface 1360 to allow data such as program content, system status and event notifications to be provided to the user, even if the main portions of the computer system are in a low power state. The auxiliary subsystem 1399 may be connected to the modem 1372 and/or network interface 1370 to allow communication between these systems while the main processing unit 1320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable storage medium having computer-executable instructions, which when executed perform steps, the steps comprising:

compressing content for network transmission from a sender to a receiver, wherein the sender and receiver comprise, respectively, either (1) an end host sender sending to an end host receiver, (2) an end host sender sending to a middlebox device receiver, (3) a first middlebox device receiver sending to a second middlebox device receiver, (4) either a mesh of one or more middleboxes or one or more end nodes, a mesh of one or more middleboxes and one or more end nodes, or a middlebox device sending to an end host receiver; and the compressing including constructing a compressed packet at the sender using a remote differential compression algorithm or speculative compression, the compressed packet including a reference to information maintained at the receiver from which the receiver can recreate the content, and sending the compressed packet to the receiver, wherein a network protocol stack executing a transport protocol on the sender below the application layer handles network transmission of arbitrary transport protocol packets for arbitrary applications, the network protocol stack receiving a transport protocol packet from an arbitrary application that the application has passed to the network protocol stack for transmission to the network, determining that content of the transport protocol packet is present in a compression dictionary, and forming the compressed packet by replacing the content of the packet with the reference information, the reference information indicating a part of the dictionary at the sender; and receiving the compressed packet at the receiver, and before passing the compressed Packet to an application on the receiver, decompressing the compressed packet by using the reference to locate the content in a dictionary at the sender the information maintained at the receiver, replacing the reference with the content, and passing the thus-decompressed packet to the application on the receiver.

2. The computer-readable storage medium of claim 1 wherein the reference comprises offset and length data relative to the dictionary on the receiver or the sender.

3. The computer-readable storage medium of claim 1 wherein constructing the compressed packet at the sender comprises including a dictionary fingerprint or a data chunk fingerprint as the reference.

4. The computer-readable storage medium of claim 1 wherein the sender includes a compression service, and having further computer-executable instructions comprising inserting a hook into the network protocol stack by which the compression service captures network packets.

5. The computer-readable storage medium of claim 1 having further computer-executable instructions that when executed perform a step comprising scheduling data transmission after compressing the content.

6. The computer-readable storage medium of claim 1 having further computer-executable instructions that when executed perform a step comprising providing at least one traffic shaping mechanism at the sender for smoothing to reduce traffic burst.

7. The computer-readable storage medium of claim 1 having further computer-executable instructions that when executed perform a step comprising further compressing the compressed packet with LZ compression.

8. The computer-readable storage medium of claim 1 having further computer-executable instructions that when executed perform a step comprising collecting contents of a plurality of respective packets prior to constructing the compressed packet.

9. A computer comprising:
   a receiver that receives network packets from a sender including compressed packets that each contain one or more references to content;
   a decompression mechanism comprising logic or a software service coupled to the receiver;
   a dictionary coupled to the decompression mechanism;
   the decompression mechanism that when run decompresses each compressed packet including by using at least one reference to locate first content in the dictionary corresponding to that reference, and merge the first content located in the dictionary with second content in the packet into a decompressed packet; and
   a compression-aware routing mechanism that reroutes data transmission based on compression ratio data, or based on probe packets sent over different paths to a common destination, or both based on compression ratio data and based on probe packets sent over different paths to a common destination.

10. The computer of claim 9 wherein the dictionary is synchronized with a sender dictionary of the sender, and wherein each reference in each packet comprises a token having offset, length data in the dictionary.

11. The computer of claim 9 wherein at least one reference comprises a data chunk fingerprint, and wherein the decompression mechanism uses each fingerprint to attempt to locate matching content in the dictionary, and wherein when the decompression mechanism fails to locate matching content in the dictionary from a given data chunk fingerprint, the decompression mechanism requests corresponding actual content from the sender.

12. A method performed by a computing device comprised of a processor and memory, the method comprising:
   compressing content at a sender for decompression at a counterpart receiver, the compressing performed with a remote differential compression algorithm that substitutes, into a compressed packet, at least one compression dictionary reference in an original transport protocol packet in place of actual content in the original transport protocol packet, and sending the compressed transport protocol packet to the receiver, wherein a plurality of transport protocol packets containing the content is collected in a buffer prior to the compressing, wherein the content is divided into chunks that are checked against the compression dictionary to find the reference, the compressing occurring transparently below the application layer on transport protocol packets that have been issued by an application for network transmission, wherein the compressing is performed by the processor and memory.

13. The method of claim 12 wherein speculative compression is used, wherein the checking comprises computing a data chunk fingerprint as a reference to one of the chunks.

14. The method of claim 12 wherein remote differential compression (RDC)* is used, wherein the compression dictionary resides on the sender and comprises a dictionary for RDC* compression, the receiver includes a receiver-side dictionary corresponding to the sender side compression dictionary, and wherein the compression dictionary reference comprises a token comprising offset and length data relative to the compression dictionary.

15. The method of claim 12 wherein the receiver includes a dictionary corresponding to the compression dictionary used by the sender, and wherein substituting the reference comprises including a fingerprint of one of the chunks as the reference.

16. The method of claim 12 further comprising, receiving the packet at the receiver, and decompressing the packet at the receiver into a copy of the original packet, including using the reference to locate corresponding content in a dictionary maintained at the receiver, wherein the decompressed packet is then passed to an application on the receiver.

17. The method of claim 16 wherein the receiver fails to locate at least some corresponding content in the dictionary, and further comprising, sending a request form the receiver to the sender for actual content from the original packet in place of the reference to the corresponding content.

18. The method of claim 17, wherein the remote differential compression algorithm uses speculative compression and the receiver requests content unavailable on the receiver.

* * * * *

UNITED STATES PATENT AND TRADEMARK OFFICE
CERTIFICATE OF CORRECTION

| | |
|---|---|
| PATENT NO. | : 7,975,071 B2 |
| APPLICATION NO. | : 12/016587 |
| DATED | : July 5, 2011 |
| INVENTOR(S) | : Ramachandran Ramjee et al. |

It is certified that error appears in the above-identified patent and that said Letters Patent is hereby corrected as shown below:

IN THE CLAIMS:

In column 16, line 58, in Claim 1, delete "Packet" and insert -- packet --, therefor.

In column 18, line 31, in Claim 14, after "to the" delete "sender side".

Signed and Sealed this
Twenty-third Day of August, 2011

David J. Kappos
*Director of the United States Patent and Trademark Office*